US006639517B1

United States Patent
Chapman et al.

(10) Patent No.: US 6,639,517 B1
(45) Date of Patent: Oct. 28, 2003

(54) LEAK DETECTION MAT AND SYSTEM

(76) Inventors: James Chapman, 43 Paddock La., Parkersburg, WV (US) 26105; Clifford J. Chapman, 1723 Cimarron Tr., Apt. 10A, Wichita Falls, TX (US) 76306

( * ) Notice: Subject to any disclaimer, the term of this patent is extended or adjusted under 35 U.S.C. 154(b) by 0 days.

(21) Appl. No.: 10/260,165

(22) Filed: Sep. 30, 2002

(51) Int. Cl.[7] .............................................. G08B 21/00
(52) U.S. Cl. ...................... 340/605; 340/604; 137/312
(58) Field of Search ................................. 340/603, 604, 340/605, 634, 525, 534, 693; 137/312; 73/40, 40.5 R, 49.2; 324/557

(56) References Cited

U.S. PATENT DOCUMENTS

| | | | |
|---|---|---|---|
| 4,264,901 A | | 4/1981 | Petersen et al. |
| 5,058,421 A | | 10/1991 | Alexander et al. |
| 5,188,143 A | | 2/1993 | Krebs |
| 5,192,932 A | * | 3/1993 | Schwab ...................... 340/604 |
| 5,440,917 A | | 8/1995 | Smith et al. |
| 5,557,263 A | | 9/1996 | Fisher et al. |
| 6,147,613 A | * | 11/2000 | Doumit ...................... 340/605 |
| 6,175,310 B1 | * | 1/2001 | Gott ............................ 340/605 |

FOREIGN PATENT DOCUMENTS

EP 0342905 A2 * 11/1989 .................... 73/40

* cited by examiner

*Primary Examiner*—Anh V La
(74) *Attorney, Agent, or Firm*—Bowles Rice McDavid Graff & Love, PLLC; John J. Giblin, Jr.

(57) ABSTRACT

A water leak detector system with alarm can be used to monitor inaccessible areas under various household appliances and warn of water leaks. A leak detection mat, having base layer of varying and appropriate sizes has disposed on it one or more pairs of electrodes arranged in a pattern around the upper surface of the base mat such that the two wires of each pair are parallel to the other and generally separated at a constant distance, and together the pair is positioned in a pattern across the surface. An absorbent layer is affixed to the base layer, covering and in contact with the electrodes. The absorbent layer may be impregnated with a soluble ionic salt to increase electrical conductivity when the adsorbent layer is wetted. A sensing and transmitting circuit having two input connections is affixed to the base substrate, with one end of each electrode attached to one of the input connections of the sensing and transmitting circuit. A plurality of leak detection mats may be used in a single system, each mat located under a potential water leak source. Upon water falling upon and being adsorbed by the adsorbent layer, the electrical resistance between the two electrodes at points nearest the leak will decrease. This decrease in resistance is detected by the sensing and transmitting circuit, which transmits a signal. An alarm unit receives the signal and activates an audible and/or visual alarm, the signal being sent either by radio waves or by an electrical signal through wires. The alarm unit is capable of monitoring a plurality of leak detection mats.

13 Claims, 6 Drawing Sheets

LEAK DETECTION MAT AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

1. Field of the Invention

The present invention relates to the field of water leak detection systems utilizing a pair of electrical conductors or probes to detect the presence of an undesirable accumulation of water by changes in the electrical impedance between the two electrodes.

2. Description of the Related Art

Water leakage from various appliances and plumbing fixtures in residential and commercial buildings has often been a problem and has caused significant damage to a building's structure, trim and cabinetry. Many appliances in the home use or contain water. These include washing machines, dishwashers, hot water heaters, refrigerators, including those equipped with ice makers, and air conditioners. Any water leakage from these appliances could flow onto the underlying floor surface and thence down into the underlying floor structure. Flooring and floor support structures manufactured of wood are susceptible to rot if left in a wet or damp condition for an extended length of time. Even a slow or intermittent leak of water from under an appliance can, over enough time, cause sufficient damage to require the replacement of the flooring, subfloor, and supporting joists. These leaks, especially smaller ones, often cannot be detected visually due to the low clearance between the bottom of the appliance and the floor.

In addition to appliances, certain plumbing fixtures and devices located within cabinetry or vanities under kitchen and bathroom sinks are susceptible to leakage and are not readily visible. These may include compression joints used in drain fittings, garbage disposals and water filters. Slow or intermittent leakage from these joints and devices may go unnoticed and cause damage to expensive cabinetry as well as to the floor systems. Even a large, substantial leak may not be apparent from outside the sink cabinetry.

Several leak detection systems to detect and warn of water leaks are available in the prior art. These include systems utilizing a pair of electrodes which detect the presence of water by a means which utilizes a change of electrical resistance between the two electrodes. The presence of water or moisture, which is capable of conducting electricity, between the two electrodes lowers the electrical resistance between the two electrodes. The reduced resistance can be detected by an appropriate electrical circuit and used to activate an audible or visual alarm.

These leak detection systems generally work well for certain applications, particularly those for protecting large areas against large volumes of water leakage. However, their ability to detect slow or intermittent leaks is limited. For example, some systems utilize short lengths of electrodes, which are posited vertically and capable of detecting a volume of water of at least a minimum height located at the electrodes. Small leaks, or leaks which do not produce pools of water which reach the electrodes, will not be detected.

Other systems use a length of paired conductors or electrodes, mounted in parallel on a long substrate, such as a strip or tape. Some of these type incorporate an absorbent layer between the electrodes which aids in the detection of smaller volumes of leakage. To use these systems to protect a certain area, the strips must be manually positioned either in a circumferential pattern around the perimeter of the area or in an anfractuous or sinuous pattern across the area. The former pattern would not detect small or intermittent leaks which did not flow laterally from under the appliance. The latter requires the appliance first to be moved and then the strip or tape is manually configured and posited in the desired pattern. Moving the appliance is often impractical or inconvenient, while bending, folding and otherwise manipulating the tape or strip into the desired pattern may damage the tape or short-circuit or break the electrodes, as might happen as well when the appliance is moved back into its original position. In either case a qualified professional, rather than the homeowner, would usually be required to properly lay out and install the system.

SUMMARY OF THE INVENTION

The present invention is directed to a leak detection mat and system which satisfies the need for detecting slow or intermittent leaks from under appliances with limited accessibility and which may be installed quickly and easily. The leak detection mat comprises a thin base substrate of dimensions proportional to the area to be monitored or the size of the appliance, upon which a pair of electrodes is affixed in a pattern, such that substantially all points of the base substrate area are located between some point on each of the two electrodes. A layer of an absorbent, porous material is posited on top of the pattern of electrodes and is adhered to the base layer.

The leak detection system includes the leak detection mat, wherein one end of each electrode is connected to a sensing means which utilizes the electrical resistance between the two electrodes. When a leak occurs, water dripping on the absorbent layer would diffuse through the absorbent layer and reach the two electrodes, reducing the resistance between the two electrodes and thereby creating an electrically conductive path. The sensing means, comprised of an electrical sensing and transmitting circuit, is connected to the ends of each of the electrodes which could detect the change in resistance between the two electrodes and transmit a signal. The sensing and transmitting circuit may be posited directly on the base substrate. In one embodiment of the invention, the sensing and transmitting circuit would be powered by a small battery. The signal is transmitted to an alarm means, being a remote receiving and alarm station in the preferred embodiment, either by wires in one embodiment or by wireless means, such as radio waves, in the preferred embodiment. The receiving and alarm station is mounted in a more visible and accessible location, thereby giving timely notice to the building's occupants of a potentially destructive leak.

One object of this invention is to provide a leak detection device which can be easily installed under home appliances having a narrow clearance between its bottom surface and the floor.

Another object of this invention is to provide a leak detection device capable of detecting a small leak originating from anywhere under an appliance.

Another object of this invention is to provide a leak detection device capable of monitoring the entire area under an appliance, but which can be installed simply by sliding the detector under the appliance.

Another object of this invention is to provide a leak detection system capable of monitoring a plurality of leak detection devices located in various locations in the building.

DETAILED DESCRIPTION OF THE INVENTION

Figure 1:
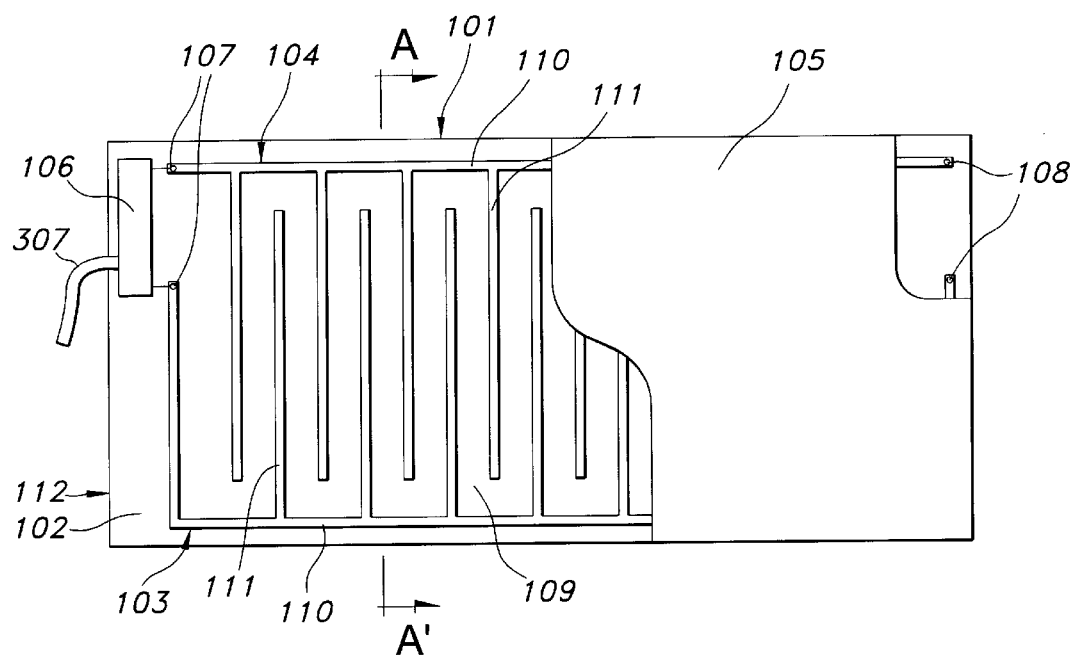
FIG. 1 is a plan view of the leak detection mat.
Figure 2:
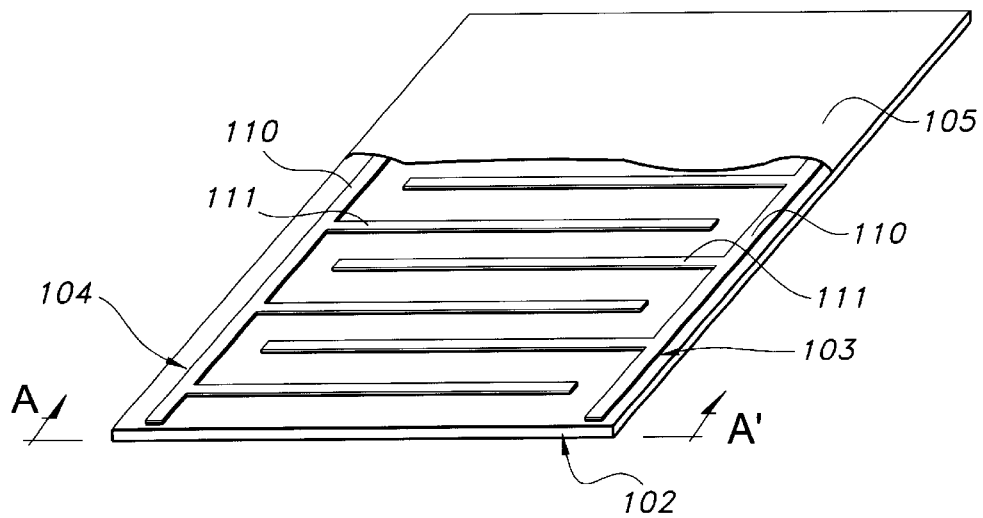
FIG. 2 is a sectional perspective drawing of the leak detection mat.

The invention disclosed herein is a leak detection system for use in residential, commercial and other buildings to detect leaks of water from appliances containing or generating water. As illustrated in FIGS. 1 and 2, the system includes a leak detection mat 101, which is constructed with a base substrate 102, upon the upper surface 109 of which are disposed first and second electrodes 103, 104. An thin, absorbent layer 105 is disposed above and adhered to most of the upper surface 109 the base substrate 102 and the two electrodes 103, 104. As shown in FIGS. 1 and 2, the absorbent layer 105 is partially cut away to show the underlying base substrate 102 and two electrodes 103, 104. Connected to one end of each electrode is a sensing and transmitting circuit 106, which transmits a coded signal upon a significant decrease in electrical resistance between the pair of electrodes 103, 104. A receiving and alarm station, not shown on FIG. 1, receives the coded signal, sounds an audible alarm and displays an identification number transmitted by the sensing and transmitting circuit 106.

The base substrate 102, having length and width, is preferably constructed from a flexible, electrically non-conductive material, such as a polymeric resin, plastic, rubber or composites of laminar films, and preferably of plasticized polyvinyl chloride sheeting. The base substrate 102 should be sufficiently stiff to allow sliding the leak detection mat horizontally across a floor surface, without gathering or wrinkling, by applying manual pressure to an edge of the leak detection mat 101.

Affixed to the upper surface 109 of the base substrate 102 are two metallic electrodes 103, 104. The electrodes 103, 104 may be wires or flat strips, and may be made of copper, aluminum or other conductive metal. The electrodes 103, 104 are affixed to the base substrate by adhesive, heat or other suitable means. The electrodes 103, 104 have sufficient thickness to effect a definite contact with the absorbent layer 105.

The two electrodes 103, 104 are affixed to the base substrate 102 in a pattern in which, to the extent desired or practical, provides any point on the base substrate 102 is located between points on either electrode 103, 104. In such a pattern, a minimal amount of water falling on the mat will then have the highest probability of creating an conductive bridge between the two electrodes 103, 104 and activating the sensing and transmitting circuit 106. The maximum distance between the two electrodes in the pattern may vary, dependant upon the sensitivity of the sensing and transmitting circuit. 106.

In the preferable pattern, each electrode 103, 104 would have a proximal end disposed along a first edge 112 of the base substrate, proximate to the other as necessary or appropriate to facilitate connection to the sensing and transmitting circuit. A main lead 110 of each electrode would first traverse along the first edge 112 in directions opposite the other electrode, then along the edges adjacent to the first edge 112 and opposite that of the other electrode. From each main lead 110, a plurality of branches 111 emanate perpendicular to the main lead, spaced at regular intervals and traversing the interior of the base substrate 102 towards the other main lead 110 and interspersed between two adjacent branches 111 of the other main lead.

In an alternate embodiment, the two electrodes 103, 104 are linear strips or wires and are disposed parallel to each other in an anfractuous or sinuous pattern across the upper surface 109 of the base substrate 102. With this pattern, however, certain points on the base substrate 102 are between the same electrode, such as within the concavity of a curve in an electrode, and small leaks in these areas may remain undetected.

In any embodiment, the proximal ends 107 of either electrode 103, 104 would be disposed along the same first edge 112 of the base substrate 102 and within a distance of the other appropriate for connection of the sensing and detecting circuit 106. Each proximal end 107 would have attached to it means for connecting to the sensing and transmitting circuit 106, such as soldering lugs, terminal jacks, screw connectors or similar type connectors. In one embodiment, the distal end 108 of each electrode 103, 104 would terminate on the edge opposite the first edge of the base substrate 102 within proximal distance of the other. From the distal ends 108, a second leak detection mat 101 may be connected by attaching wires, jumpers or other electrical connectors to the proximal ends 107 of a second detection mat 101.

On top of the base substrate 102 and the pair of electrodes 103, 104 is affixed an absorbent layer 105. The absorbent layer 105 may be fabricated of a woven cloth or felt, made with cotton, wool, linen, flax, jute or their blends with synthetic fibers. The absorbent layer 105 may also be made of a layer of polymeric foam, such as polyurethane. The absorbent layer 105 is affixed to the base substrate 102 using, for example, contact adhesive. The absorbent layer 105 is adhered to the base substrate 102 such that the absorbent layer 105 is in firm contact with the electrodes 103, 104.

When water drips onto the absorbent layer 105, the water is absorbed into the fibers or material of the absorbent layer 105, thereby increasing the electrical conductivity of the dampened area. As water continues to drip or leak onto the absorbent layer 105, the interstitial and free water migrate radially away from the initial contact point by diffusion and hydraulic flow, until the dampened area extends over some point on each of the two electrodes 103, 104. At this point, electrical current may conduct between the two electrodes 103, 104 through the dampened material of the absorbent layer 105. As a result, the resistance between the termini 107 of the two electrodes 103, 104 will decrease, which can be sensed or measured by an appropriate electrical circuit and an alarm thereby triggered.

In one embodiment, the absorbent layer 105 is impregnated with a aqueous-soluble salt, thereby increasing the electrical conductivity of the dampened fiber. The absorbent layer 105 may be impregnated by saturating it with an aqeous salt solution, then drying the absorbent layer 105. Suitable salts for impregnating the absorbent layer 105 include sodium chloride and potassium chloride.

Figure 3:
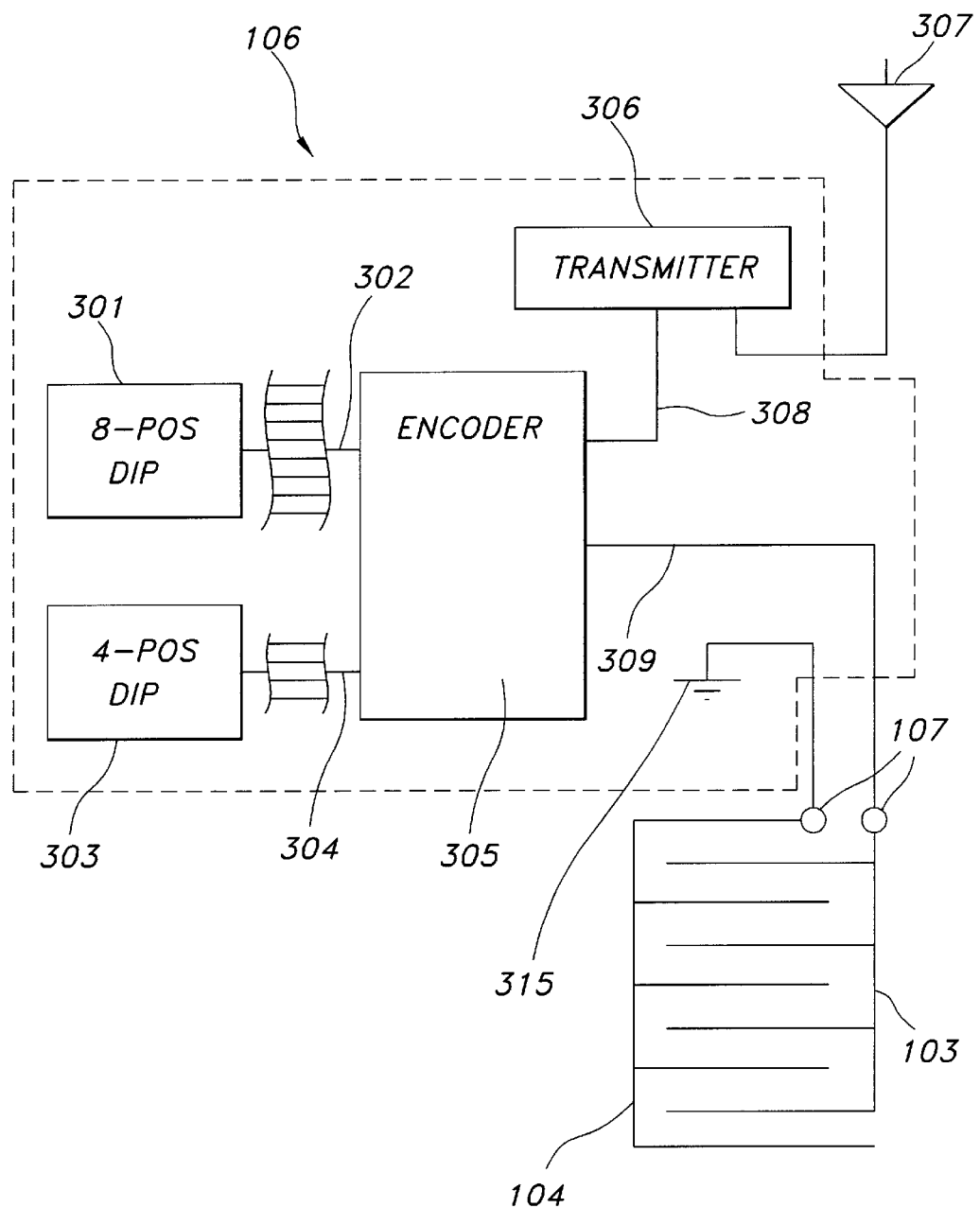
FIG. 3 is a diagram of the sensing and transmitting circuit.

The sensing and transmitting circuit 106, for sensing decreases in the electrical resistance across the two electrodes and transmitting a signal, is preferably mounted on the base substrate 102 near to the proximal ends 107 of the two electrodes 103, 104. As shown in FIG. 3, the subcircuits within the sensing and transmitting circuit sense a decrease in resistance between the two electrodes 103, 104 by impressing a voltage on electrode 103 through a built-in pull-up resistor in an encoder chip 305, while electrode 104 is connected to ground. The encoder chip 305 is a Holtek Semiconductors, Inc. Model HT12E, having a Transmit Enable ("TE") input 309 internally connected to the source voltage 311 through pull-up resistance. The pull-up resistance with the encoder chip 305 is high relative to the resistance between the electrodes 103, 104 when the absorbent layer has been wetted. In operation, when no leak is present and the leak detection mat is dry, the voltage at the first electrode 103 equals the supply voltage 311, also known as the ON state. Once a leak occurs, the absorbent layer is wetted and electrical continuity between the two electrodes 103, 104 is established, permitting electrical current flow from voltage source 311, through encoder chip 305, and across the electrodes 103, 104 to ground 315. The current flow permits a voltage drop across the built-in resistance of encoder chip 305 that results in having near zero voltage at chip at TE 309, also known as the OFF state for the terminal The relatively high voltage drop across the built-in resistance and near-zero, or low, voltage drop across the conducting electrodes 103, 104 maintain the OFF state so long as electrical continuity exists between the two electrodes 103, 104.

Upon switching to the OFF state at TE 309, a 12-bit code is transmitted. To generate the 12-bit code, the encoder chip 305, also has 8 address inputs 302, 4 data/address inputs 304, and a data output 308. In operation, when the voltage at TE 309, which is connected to the first electrode 103, switches to the OFF state, the encoder 305 communicates a series of 12 binary pulses on the data output 308, the pulses of which corresponding to the states of the 8 address inputs 302 concatenated with the 4 data inputs 304. The states of the 12 inputs are controlled by an 8-position DIP switch 301 and a 4-position DIP switch 303, the jumpers of which are manually positioned. The 8-position DIP switch 301 sets a verification code, which must be identical in all other sensing means and in the alarm means used in the system. The 4-position DIP switch 303 sets an identification code unique for each individual sensing means. While a 4-bit binary number could represent one of 16 combinations, only up to 10 are used in the preferred embodiment, as the identification code is processed as binary coded decimal ("BCD") in the receiver. Thus, the permissible settings for the 4-position DIP switch are from 0000b to 1001b.

The transmitter chip 306 may be a commonly available chip, such as a Reynolds Electronics TWS-434 transmitter. When a 12-bit pulse code is received on its input terminal, the 12-bit code is transmitted by radio through an antennae 307 attached to the RFOUT port of the transmitter chip. Dependent upon the required range, the antennae 307 may be up to 35 cm in length and an impedance of 50 ohm for optimal range.

The encoder chip 305 continually outputs the 12-bit code, which is continually transmitted by the transmitter chip 306, so long as voltage at TE 309 remains in the OFF state. Once the absorbent layer 105 of the leak detection mat 101 dries, and resistance across the two electrodes 103, 104 increases and current flow between the electrodes 103, 104 diminishes, thereby restoring voltage at TE 309 to the ON state, disabling TE 309 and ceasing transmission.

Power to the encoder chip 305 and the transmitter chip 306, along with supply voltage 311 to the detection mat first electrode, is provided by a battery in the preferred embodiment. Power may also be provided through a power supply using common 110-volt alternating current. Such power supplies are well known to those skilled in the art.

Figure 4:
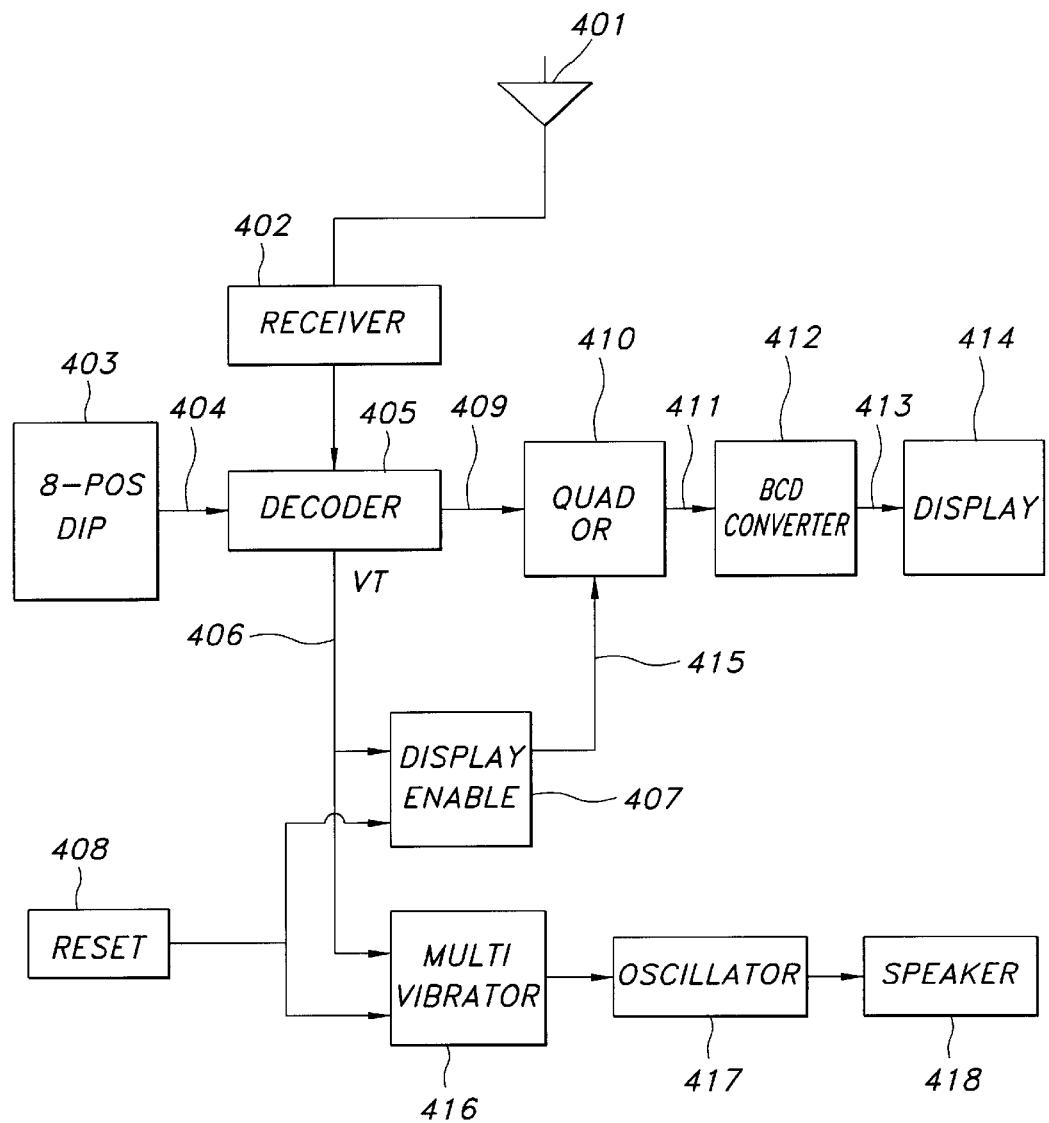
FIG. 4 is a diagram of the circuits comprising the receiving and alarm station.

An alarm means 400, shown in FIG. 4, is provided as part of the leak detection system to receive the 12-bit signal transmitted from the transmitter chip 306 and to provide an alarm. In the preferred embodiment, as shown in FIG. 4, included in the alarm means is a receiver chip 402, such as a Reynolds Electronics RWS-434 receiver, which receives the signal through its antennae 401. The receiver chip 402 operates at the same frequency with the transmitter chip 306. When a signal is received by the receiver chip 402, the signal is communicated to a decoder 405, such as a Holtek Semiconductor Inc. model HT12D decoder. The decoder 405 has 8 address inputs 404, 4 data outputs 409, and a Verified Transmission ("VT") output 406.

An 8-position DIP switch 403 is connected to the 8 address inputs 404 of the decoder chip 405. The jumpers on the 8-position DIP switch 403 must be positioned identical to the same positions as the jumpers on the 8-position DIP switch 301 in the sensing means 106. When the receiver chip 402 communicates the same 12-bit code to the decoder 405 three times sequentially, the first eight bits parsed from the received code are compared by the decoder 405 with the values on the 8 address inputs 404. If all eight bits match, a valid signal has been received, at which point the last 4 bits are communicated on the 4 data outputs 409 and the VT output 406, which is normally OFF, is switched ON. The 4 data bits are internally latched within the decoder 405 and continue to be communicated on the 4 data outputs 409 until another 12-bit code is communicated three times sequentially from the receiver chip 402. The VT output 406 switches OFF shortly after cessation of communication of the 12-bit code from the receiver chip 402. Upon switching the VT output 406 to ON, the 4-bit identification code is displayed as a single decimal digit on an display 414 and an alarm buzzer is activated for approximately 5 seconds.

Figure 5:
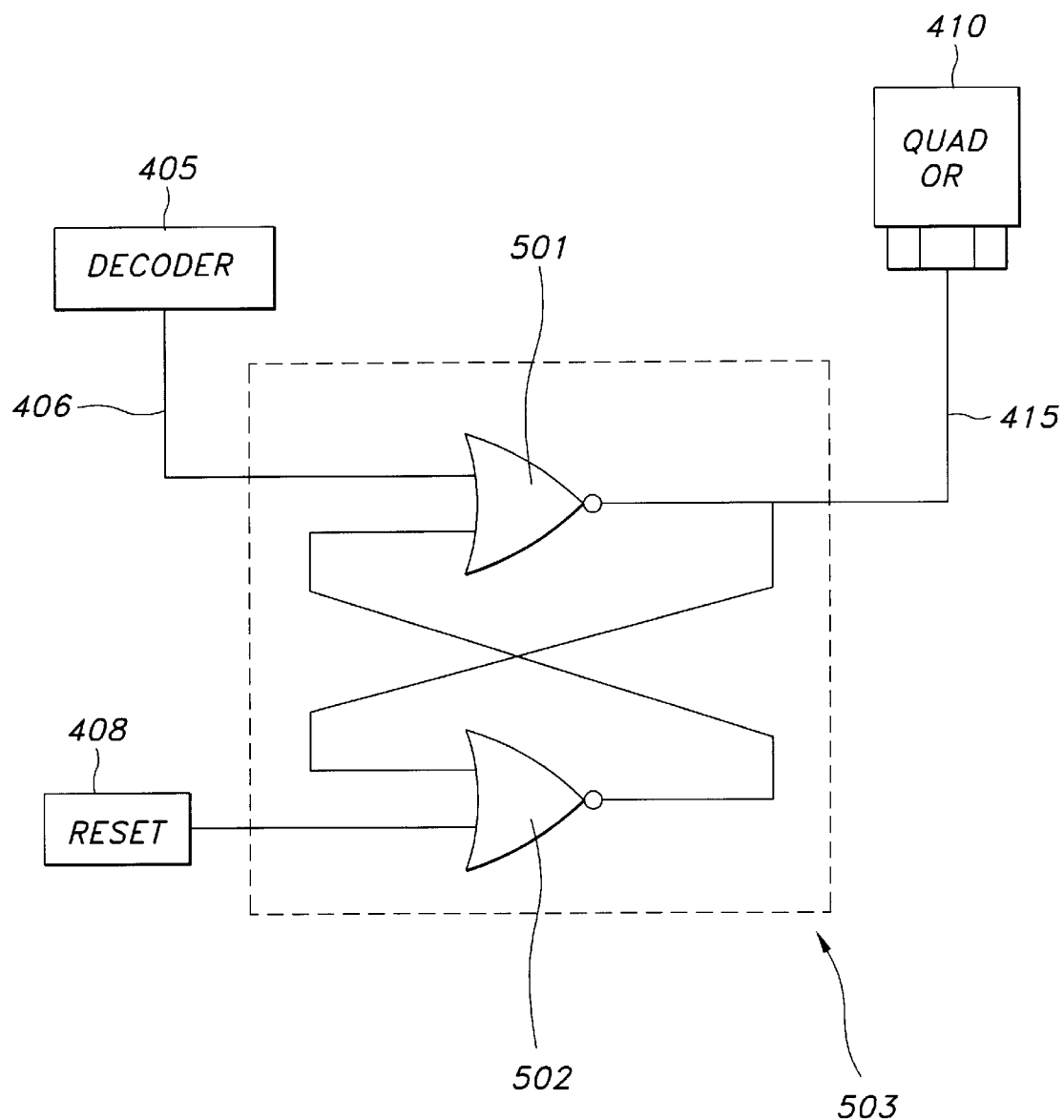
FIG. 5 is a diagram of the display-enable flip-flop (FF) circuit in the receiving and alarm circuit

The display 414 is latched, displaying the identification code until a reset button 408 is manually pressed. As shown in FIG. 5, the display 414 is activated and latched by inputting the VT signal 406 to a display enable Flip-Flop circuit 507 consisting of first and second NOR gates 501 and 502. This type of Flip-Flop circuit, commonly referred to in the art as an R-S Flip Flop, has a Set and a Reset input and a Normal State output and an Inverse State output. In an R-S Flip Flop circuit generally, when the set input changes to the ON state, the Normal State output turns ON and the Inverse State output turns OFF. The outputs remain in these states, even when the Set input switches to OFF, until the Reset input turns ON. Then, the Normal State output switches to OFF, the Inverse State output switches to ON, and each remains in that state even after the Reset input switches to OFF.

The VT signal 406 sets the display-enable Flip-Flop 407, while the manual reset button 408 resets it. The inverse state output 415 of the display-enable Flip-Flop 407 communicates in parallel with a first input of each of four 2-input OR gates located in the quad OR chip 410. The quad OR chip 410 is a Philips Semiconductors Model HEF4071B quadruple 2-input OR gate in the preferred embodiment. Within the quad OR chip 410, the second input of each OR gate receives one of the four bits of the identification code communicated on the 4 data lines 409 of the decoder chip 405. The four outputs 411 of the four OR gates in the quad OR chip 410 communicate with the inputs of a binary coded decimal (BCD) to 7-segment LED converter (the "BCD converter") 412, as shown in FIG. 4. The BCD converter 412 may be a commonly available IC chip, such as a Philips Semiconductors model HEF 4543 latch/decoder/driver. The BCD converter 412 internally converts the four outputs 411 into 7 separate outputs that communicate across the display data circuits 413 to drive a 7-segment LED or LCD display 414. The display 414 reveals the corresponding decimal digit. The display 414 may be one of many 7-segment LEDs or LCDs commonly known in the art. When the VT signal 406 switches OFF, the inverse output of the display-enable Flip-Flop 407 remains OFF, which, once processed through the four OR gates in the quad OR chip 410, will result in continued communication of the 4 bits of the identification code to the BCD converter 412. Once the manual reset 408 is pressed, the display enable Flip-Flop 407 will reset, switching its inverse output 415 to ON. When this inverse output 415 is processed by the quad OR chip 410, all four outputs 411 of the quad OR chip 410 will be ON. When this code, 1111b, is communicated to the BCD converter 412, all 7 outputs on the display data circuits 413 are switched OFF, clearing the single-digit display 414. Thus, the display 414 will continue to display the last received identification code until the manual reset switch 408 is pressed, after which the display 414 will clear until another valid code is transmitted.

The VT output 406 also activates the speaker circuitry, which activates a buzzer for about 5 seconds in the preferred embodiment. As shown in FIG. 4, this is accomplished using an astable multivibrator 416 which activates an oscillator 417 for about 5 seconds, producing an oscillating wave communicated to a speaker 418 with an audible signal of about 1 kilohertz.

Figure 6:
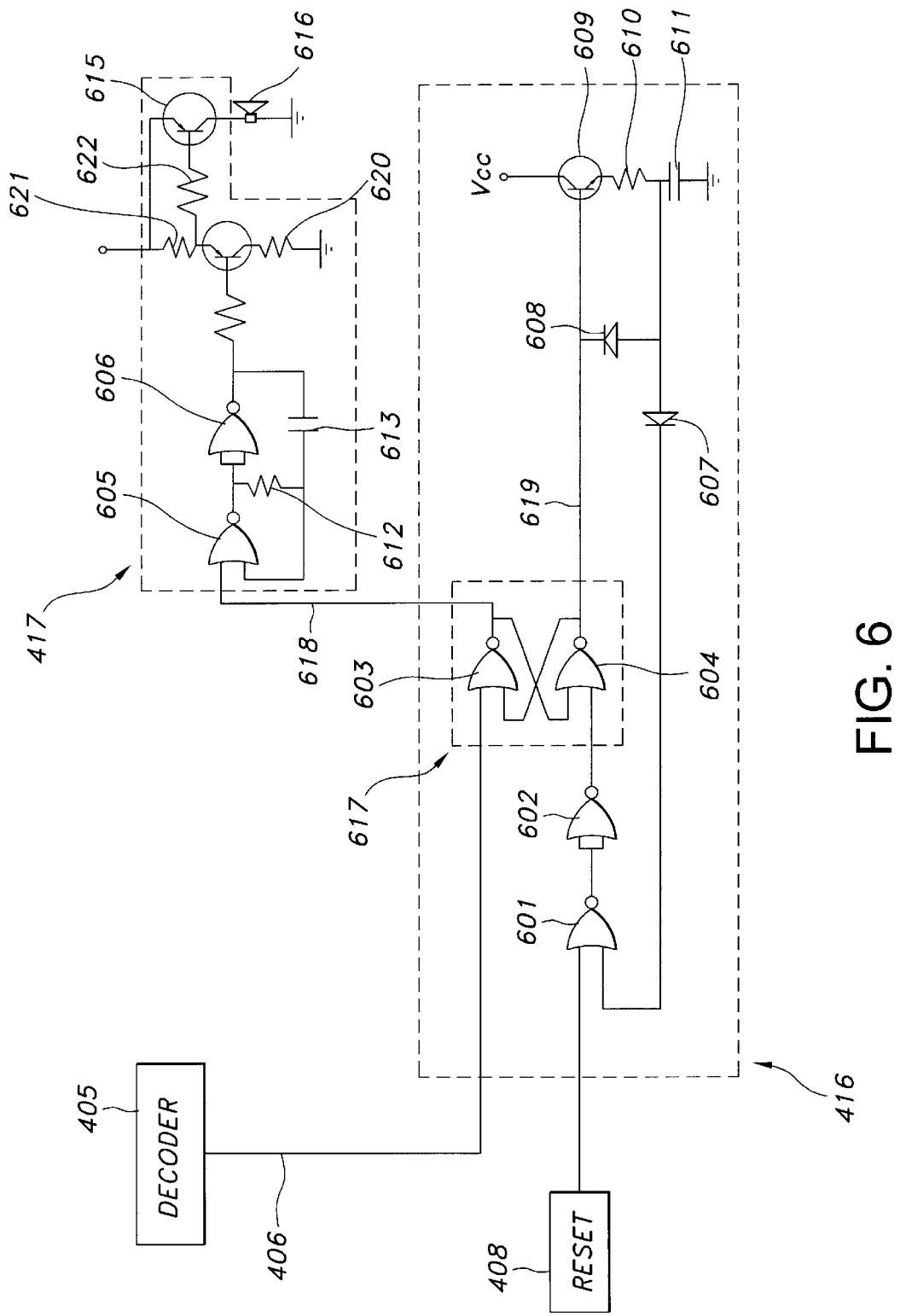
FIG. 6 is a diagram of the multivibrator and the oscillator circuits in the receiving and alarm station.

As depicted in FIG. 6, the multivibrator 416 uses a flip-flop circuit 617, comprised of two NOR gates 603 and 604. The flip-flop circuit 617 is latched ON upon the VT signal 406 from the decoder 405 switching ON. The normal output 619 of the Flip-Flop 617, which is normally OFF, is switched ON. The normal state output 619 of the flip-flop circuit 617 communicates with the base of an NPN transistor 609, the collector of which is provided supply voltage. When the normal state output 619 of the flip-flop 617 switches ON, the base-emitter junction of NPN transistor 609 is forward-biased, and the NPN transistor 609 is turned ON. Current flows, gradually charging capacitor 611 and increasing the voltage in the circuit from the collector of NPN transistor 609. The rate at which the voltage increases is inversely proportional to the resistance of resistor 610 and the capacitance of capacitor 611. Once the capacitor voltage exceeds the threshold voltage of diode 617, a minute amount of current will flow to the first input of NOR gate 601 allowing a high input. NOR gate 601 performs a logical NOR on the output of the diode 607 and the signal from the reset switch 408. The output of NOR gate 601 is inverted by a second NOR gate 602 in series. The output of NOR gate 602 serves as the reset input for flip-flop circuit 617 by communicating with one of the inputs of NOR gate 604.

The inverse output 618 of the flip-flop 617 in the multivibrator 416 communicates with an oscillator 417, which is comprised, in part, of two NOR gates 605 and 606 in series. The inverse state output 618 of the Flip-Flop 617 serves as the first input to NOR gate 605, while the output of NOR gate 605 feeds back to the second of its inputs through a resistor 612. The output of NOR gate 605 also communicates with both inputs of NOR gate 606, the output of which thus inverts the output of NOR gate 605. A capacitor 613 communicates between the feedback loop of NOR gate 605, after the resistor, and the output of NOR gate 606. In this configuration, once the input to NOR gate 605 from the inverse output 618 of Flip-Flop 617 switches to OFF from its normal ON state, the output of NOR gate 606 will oscillate between ON and OFF over a period proportional to the capacitance of capacitor 613 and the resistance of resistor 612. This oscillation is achieved by the feedback in NOR gate 605. Once the inverse output 618 from Flip-Flop 617 turns from normally ON to OFF, the output from NOR gate 605 will switch from normally OFF to ON. However, due to resistor 612 and capacitor 613, the voltage in the feedback to the second input to NOR gate 605 increases only gradually over a finite period of time to switch from the OFF state to the ON state. Once the voltage in the feedback to NOR gate 605 reaches the ON state, the output from NOR gate 605 will switch to OFF, and the charge stored in capacitor 613 will gradually reverse polarity by quickly charging from the output of NOR gate 606 and by slowly deischarging through resistor 612 into the output of NOR gate 605, until the voltage in the feedback to the second input of NOR gate 605 reaches OFF state, and the cycle repeats itself.

The output of NOR gate 606, being the inverse of NOR gate 605, communicates with the base of PNP transistor 614. The collector of PNP transistor 614 originates from a split-resistor circuit formed by resistors 621 and 622, which communicates supply voltage to the base of PNP transistor 615. The emitter of PNP transistor 614 communicates to ground through resistor 620. The collector of PNP transistor 615 is provided supply voltage, and the emitter of PNP transistor 615 communicates with a speaker 616, and thereafter to ground.

In the normal state, the output of NOR gate 606 is ON, which creates a reverse-bias across the base-collector junction of PNP transistor 614, cutting off PNP transistor 614. When PNP transistor 614 is OFF, the voltage to the base of PNP transistor 615 equals the supply voltage, which causes a reverse bias across the base-collector junction in PNP transistor 615, cutting off PNP transistor 615. If PNP transistor 615 is OFF, the speaker receives no current and is deactivated. Once the output of NOR gate 606 switches OFF, the base-collector junction of PNP transistor 614 is forward-biased and turns ON, which causes the base-collector junction of PNP transistor 615 to forward bias and turn ON, thereby activating the speaker. The 1-kilohertz frequency at which the output of NOR gate 606 cycles between the ON and OFF states will thereby produce an audible tone at 1 kilohertz in the speaker 616. PNP transistor 615 serves to amplify the power output of PNP transistor 614.

After a leak has been detected and the display and speaker activated, the alarm means 400 is reset by manually pressing the reset button 408, which resets the display-enable Flip-Flop 503 and the Flip-Flop 617 in the multivibrator 416. The system is then enabled to monitor for a subsequent water leak.

Figure 7:
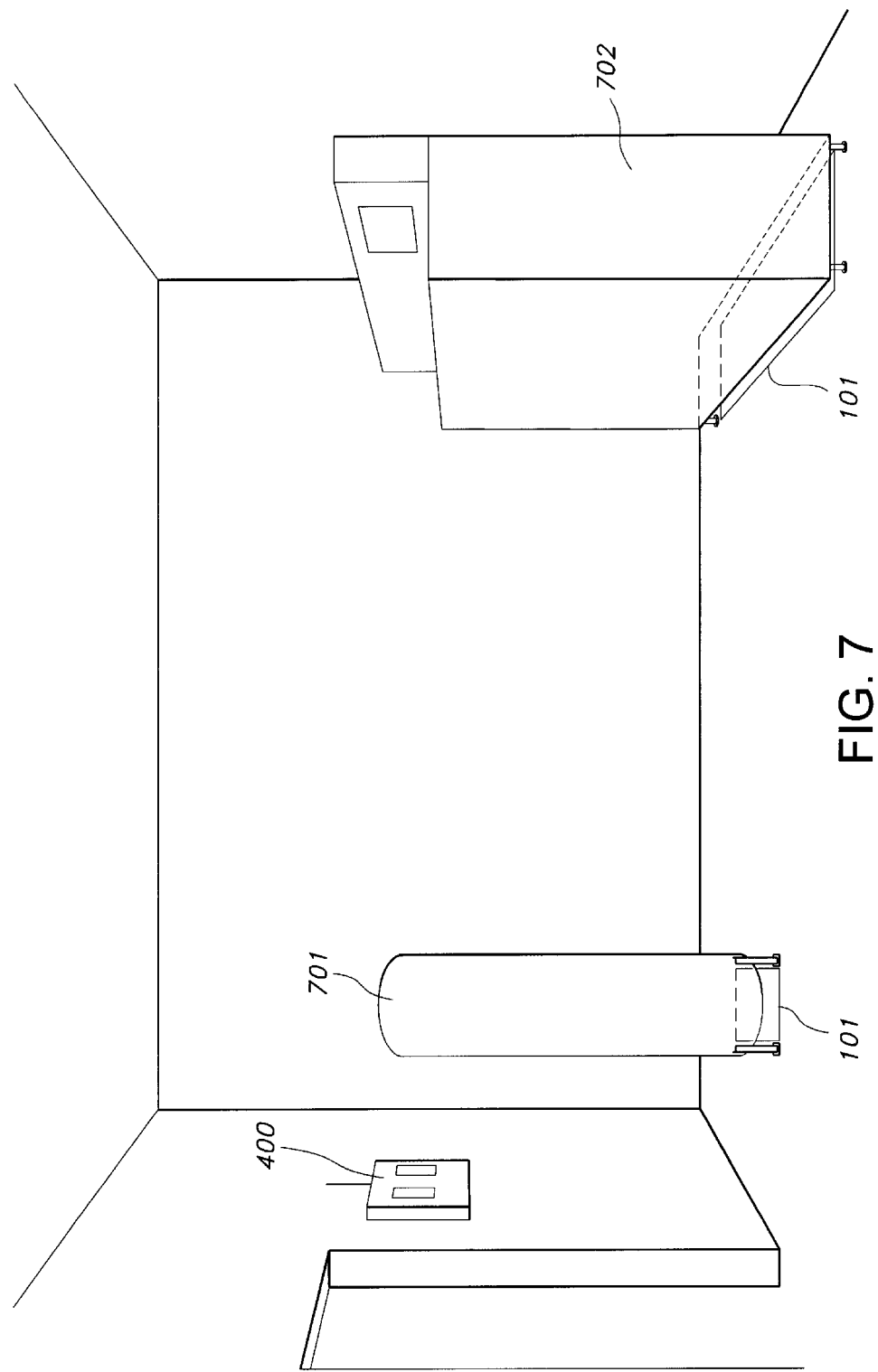
FIG. 7 is a diagram of a typical leak detection system in use, showing a plurality of leak detection mats, each with a sensing and transmitting circuit, and a central receiving and alarm station.

In use, as shown in FIG. 7, leak detection mats 101 may be placed under various appliances containing water, such as a washing machine, 702 and a hot water heater 701. The alarm means 400 would be mounted in a more visible location convenient for the building occupants, and may be located in a room other than that in which the leak detection mats are located. Other leak detection mats, not shown, may be located in other rooms of the building and monitored by the same alarm means 400.

We claim:

1. A leak detection mat, comprising:
    (a) a base substrate, having an upper surface and a first edge;
    (b) a pair of electrodes, each having proximal and distal ends and an upper surface, wherein each electrode is rigidly affixed to the upper surface of the base substrate and the electrodes are arranged in a two dimensional pattern across the upper surface of the base substrate wherein any point on the upper surface of the base mat within the pattern is situate between either electrode and the proximal ends of each electrode are located adjacent to the first edge of the base substrate;
    (c) an absorbent layer, affixed to the upper surface of the base substrate and substantially in contact with the length of the upper surface of each electrode, except within a length adjacent to the proximal and distal ends of each electrode as necessary or desired to facilitate connection of electrical circuits or jumpers to other leak detection mats;
    (d) means for attaching an electrical circuit to the proximal ends of each electrode.

2. The leak detection mat of claim 1, whereby the base substrate is a sheet made of a flexible polymeric resin, plastic, rubber or a composite of laminar films.

3. The leak detection mat of claim 2, whereby the flexible polymeric resin is plasticized polyvinyl chloride.

4. The leak detection mat of claim 1, wherein the absorbent layer is impregnated with an aqueous soluble salt.

5. The leak detection mat of claim 1, wherein the absorbent layer is constructed of woven fibers, felted fibers or polymeric foam.

6. The leak detection mat of claim 5, wherein the fibers are cotton, wool, linen, flax, jute, synthetically produced fibers, or blends of two or more of the preceding fibers.

7. The leak detection mat of claim 1, whereby the pattern of each electrode comprises a main lead traversing the upper surface of the base substrate from its proximal end along the first edge in a direction opposite the other main lead, thence along an edge adjacent to the first edge and opposite the edge of the other main lead, to the distal end of each electrode posited along the edge of the base substrate opposite the first edge, each main lead having a plurality of branches emanating at regular intervals, traversing across the upper surface perpendicular to and away from the edge of the mat, and running between two branches emanating from the other main lead, and terminating before the other main lead.

8. A leak detection system, comprising
    (a) a leak detection mat, comprising
        (i) a base substrate, having an upper and a lower surface and a first edge;
        (ii) a pair of electrodes, each having proximal and distal ends and an upper surface, wherein each electrode is rigidly affixed to the upper surface of the base substrate and the electrodes are arranged in a two dimensional pattern across the upper surface of the base substrate wherein any point on the upper surface of the base mat within the pattern is situate between either electrode and the proximal ends of each electrode are located adjacent to the first edge of the base substrate;
        (iii) an absorbent layer, affixed to the upper surface of the base substrate and substantially in contact with the length of the upper surface of each electrode, except within a length adjacent to the proximal and distal ends of each electrode as necessary or desired to facilitate connection of electrical circuits or jumpers to other leak detection mats; and
        (iv) means for attaching an electrical circuit to the proximal ends of each electrode;
    (b) sensing means for sensing a decrease in electrical resistance between the two electrodes and then transmitting a signal, wherein the sensing means is in electrical communication with the means for attaching an electrical circuit, and;
    (c) alarm means in communication with the sensing means for receiving the signal transmitted by the sensing means and annunciating an alarm upon receipt of the transmitted signal.

9. The leak detection system of claim 8, wherein the transmission of the signal from the sensing means to the alarms means is by radio waves.

10. The leak detection system of claim 8, further comprising:
    (a) a plurality of leak detection mats, each with sensing means, wherein the signal transmitted by the sensing means contains a unique identification code; and
    (b) wherein the alarm means further comprises a display means for displaying the unique identification code received from any one of the sensing means.

11. The leak detection system of claim 10, further comprising a silence means for automatically terminating the annunciation of the alarm after a fixed time period while continuing the display means.

12. The leak detection system of claim 10, wherein the number of sensing means in the leak detection system monitored by one alarm means is less than or equal to ten.

13. The leak detection system of claim 10, further comprising reset means for manually resetting and clearing the display means.

* * * * *